United States Patent [19]
Gupta

[11] Patent Number: 5,333,186
[45] Date of Patent: Jul. 26, 1994

[54] TELECOMMUNICATION CALL BILLING METHOD AND APPARATUS

[75] Inventor: Shiv K. Gupta, Red Bank, N.J.

[73] Assignee: AT&T Bell Laboratories, Murray Hill, N.J.

[21] Appl. No.: 755,465

[22] Filed: Sep. 5, 1991

[51] Int. Cl.5 .............................................. H04M 3/42
[52] U.S. Cl. ...................................... 379/201; 379/114
[58] Field of Search ............... 379/201, 144, 143, 121, 379/91, 114, 68, 70

[56] References Cited

U.S. PATENT DOCUMENTS 4,611,094  9/1986  Asmuth et al. ...................... 379/201
4,930,154  5/1990  Bauer et al. ......................... 379/201
5,003,584  3/1991  Benyacar et al. .................... 379/201

Primary Examiner—James L. Dwyer
Assistant Examiner—Ahmad F. Matar
Attorney, Agent, or Firm—John A. Caccuro

[57] ABSTRACT

A sponsored-call service feature enables callers to obtain network-provided telecommunication services toll-free or at a subsidized rate. The sponsored-call service permits a third party sponsor to convey commercial messages to and interact with a caller prior to the caller's access to the network-provided services. After the caller's interaction with the sponsor, the network gives the caller a sponsored-specified restricted access to the network-provided services.

17 Claims, 3 Drawing Sheets

FIG. 4

TABLE 400 - SPONSOR SERVICE ACCESS CRITERIA

A. WHEN CALLER ENTERS CREDIT CARD NO./DEPOSIT COINS/REQUESTS COLLECT CALL
- DETECT INVALID CARD NUMBER
- DETECT A NULL CARD NUMBER (e.g.,#)
- CALLER FAILS TO DEPOSIT SOME OR ALL OF THE MONEY
- CALLER DIALS SPECIALLY DESIGNATED NUMBER(S)

B. PRIVATE PHONES USE PRE-SUBSCRIPTION OR SPECIAL DIGITS

C. OPERATOR ASSISTED ACCESS

TABLE 500
CALL PROFILE - SPONSOR'S ACCESS CRITERIA

ORIGIN OF CALL
CALL DESTINATION
DATA AND TIME
SPECIAL EVENTS
⋮

TELECOMMUNICATION CALL BILLING METHOD AND APPARATUS

TECHNICAL FIELD

This invention relates to the billing of telecommunication calls, and more particularly to the billing of sponsored telecommunication calls.

BACKGROUND OF THE INVENTION

The provision of long distance telephone service is very competitive in today's marketplace. Carriers are constantly developing and announcing new calling services and offering ever-decreasing communication costs for existing services provided to business and residential customers. Very often, these new services take advantage of the flexibility available in today's modem computer controlled communication network. Because of intense competition, there is a continuing need for telecommunication companies to provide customers with new value-added services or to reduce the cost of existing services.

SUMMARY OF THE INVENTION

In accordance with the present invention, a communication system method and apparatus is disclosed for reducing the calling charges to a caller in exchange for the caller receiving a sponsor's information message delivered over the connection between the caller and the communication system.

More particularly, in response to receiving an incoming call request from a caller, the communication system determines whether the caller is to be connected to a sponsor service. In response to such a determination, the caller is provided with an information message associated with said sponsor service.

Other features enable the sponsor service determination to be made by comparing caller inputs, calling party number and other call characteristics against predetermined access criteria for the sponsored service.

According to another feature of the invention, the sponsored service is provided by a sponsor selected from a group of service sponsors using sponsor-determined criteria. Other features bill the sponsor for charges associated with the caller and sponsor connection as well as a portion of the caller usage of communication system services.

BRIEF DESCRIPTION OF THE DRAWING

FIG. 4 shows a table illustrating various sponsor service access criteria; and

FIG. 5 shows a table illustrating various call profile characteristics used to select a sponsor.

DETAILED DESCRIPTION

In the following description, each item or block of each figure has a reference designation associated therewith, the first number of which refers to the figure in which that item is first located (e.g., 110 is located in FIG. 1 and step 303 is located in FIG. 3).

Figure 1:
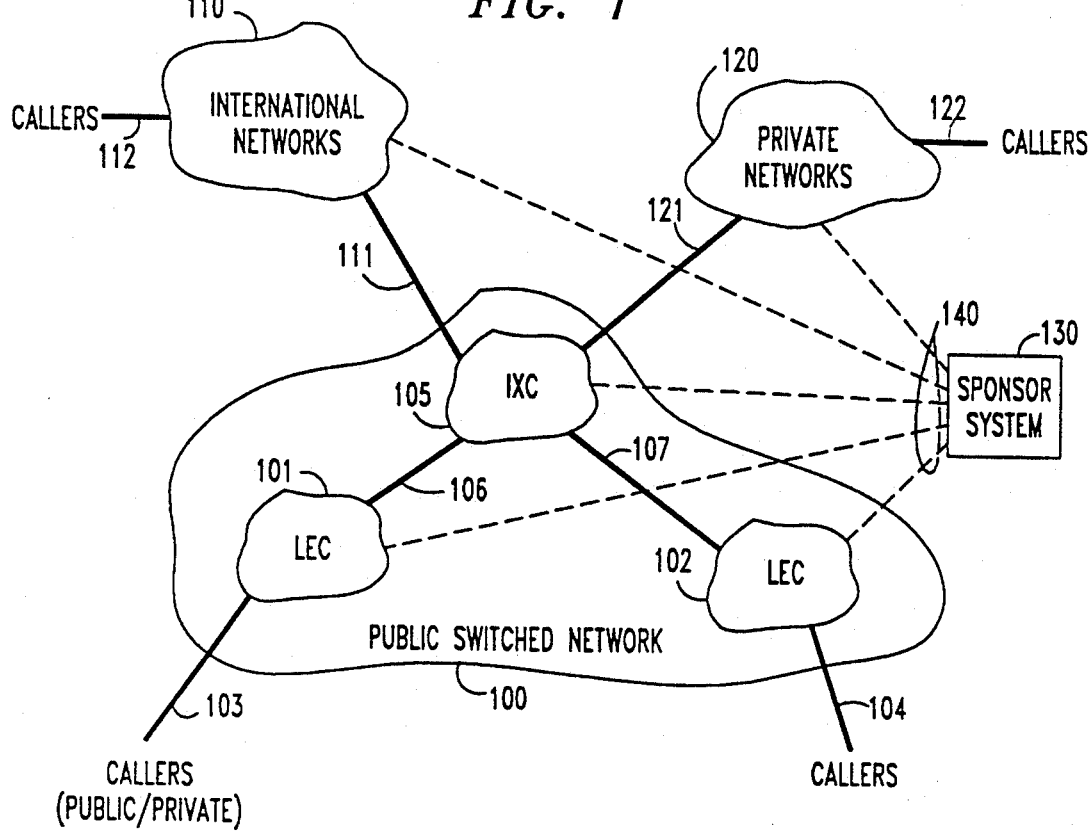
FIG. 1 shows an illustrative block diagram of a generalized network including a public switched network, international network and private networks and the connection of the sponsor system thereto.

With reference to FIG. 1 there is shown an illustrative block diagram of a well-known telecommunication network useful in describing the operation of my inventive sponsored call service method and apparatus. The drawing illustrates a public switched network 100, an international network 110 and a private network 120. The public switched network, illustratively, includes Local Exchange Carriers (LEC) switching offices 101 and 102, which serve associated public and private callers over facilities 103 and 104, respectively. An Inter-Exchange Carrier (IXC) network 105 connects over trunks 106 and 107 to LEC 101 and LEC 102, respectively. The IXC 105 also connects over trunks 111 and 121 to international network 110 and private network 120, respectively. The apparatus details of the LECs 101 and 102, IXC 105, international network 110 and private network 120 form no pan of my sponsored call service and are only described hereinafter to the extent necessary for an understanding of my invention.

The LEC networks 101 and 102 provide intra-LATA services, the IXC network 105 provides inter-LATA and other services not available through the LEC networks, and the International Networks 110 provide services of the foreign administrations. Callers access network services through their direct access, e.g., via facilities 103 and 104, of the LEC network (e.g., public or private phones or data lines) or via their private facility 122 and private networks (e.g., 120) connected to LEC or IXC networks. The international callers may similarly access network services, via facility 112, of their International Networks 110.

The specific services provided by each network (LEC, IXC and International) vary depending on the plans of the network administration. Since these networks are interconnected, the services provided by these various networks are accessible to various callers depending on their access agreement with various service providers. The service providers may offer a mix of toll and toll-free telecommunication services to such callers. My innovative sponsored services feature as described in this disclosure, relates to the addition of a new capability in the network whereby the network allows a caller to interact with a sponsor system 130 (either embedded in the network (not shown) or external thereto and connected via facilities 140) prior to allowing the caller access to the requested network service.

The sponsored services feature is shown being implemented using a call sponsor's system 130 which operates in conjunction with a sponsored service overlay (one or more programs which interface the sponsored services to existing network services). It should be noted that the sponsor provided information or the sponsor system 130 itself could be resident in the network, available externally, or a combination thereof.

Additionally, while the present invention has been described as a sponsor provided service, it may more generally be any optional service which may or may not have a third party sponsor. Thus, the optional service may be provided, for example, by the local telephone company or long distance carrier themselves rather than a third party sponsor.

Figure 2:
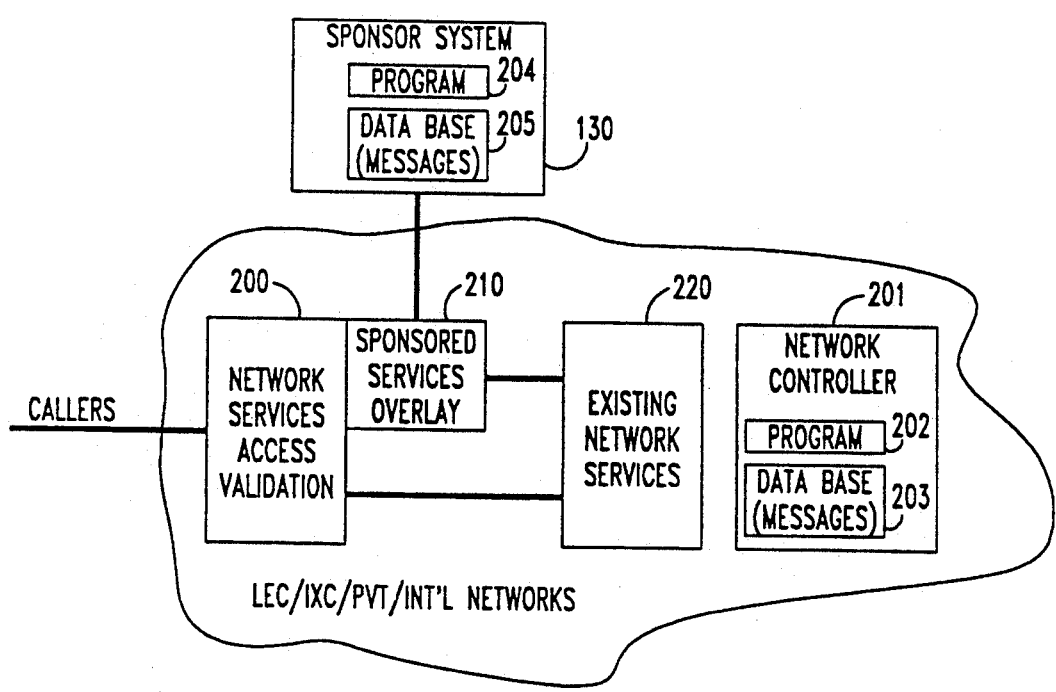
FIG. 2 shows an illustrative sponsored services overlay, in accordance with the present invention, which enables the sponsor system access to the various networks of FIG. 1.

The sponsored services overlay, as shown in FIG. 2, may be located in one or more of the previously-described systems or networks LECs 101 or 102, IXC 105, international networks 110, private networks. Typically, the sponsored services overlay would be stored along with other network programs in a program store 202 and associated data (e.g., information messages) in the data store 203 of the network controller 201. The sponsor system 130 communicates with the sponsored services overlay over one or more facilities 140. In addition, the sponsored services feature may be located in various networks and can be interconnected giving rise to a sponsored service feature which is distributed over the public switched network.

With reference to FIG. 2 the sponsored services overlay 210 interfaces the sponsor system 130 to the network services access validation unit 200 and existing network services unit 220. Briefly, the sponsored services feature operation is as follows. The network validation unit 200 and overlay 210 screen a caller service request to identify if the request is a regular service request or a sponsored service request. Calls requesting the sponsored services feature will be processed by the sponsor system 130 prior to the caller being connected to the requested network service via existing network services unit 220. The sponsors could convey their messages through network's playing of pre-recorded information messages, network's execution of a pre-defined set of instructions, transfer the call to sponsor's system 130 or a combination thereof.

The network is capable of specifying a sponsor from a group of sponsors for each call based on a call's or caller's profile so that the sponsors can design their targeted marketing programs. The network is able to define the call's profile based on its access to a number of information elements including call's origin, destination, date, time, traffic volume, type of service, etc. The sponsor may also be specified by the network based on sponsor-defined criteria. After the caller's interaction with the sponsor, the network will give callers controlled access to the caller's original service request.

The illustrative sponsor system 130 may be processor controlled and includes a program store 204 for storing programs for controlling the sponsored services feature and a data store 205 for storing data and messages to be outputted to the caller. Sponsor system 130 may also include operators for handling aspects of the sponsored service feature which require human interaction.

Before proceeding with the operating description of the sponsored services feature, it should be recognized that it may be adapted for use with a variety of different networks or systems shown in FIG. 1. Since the various networks and systems shown in FIG. 1 utilize a variety of hardware and programming techniques, no attempt is made to describe the existing programs used to control these various systems. However, using the flow charts of FIG. 3 and the following description as a guide, the operations of the sponsored services feature may be integrated into the program and control structure of the associated networks of FIG. 1, and tailored to cooperate with other features and operations of those networks.

Figure 3:
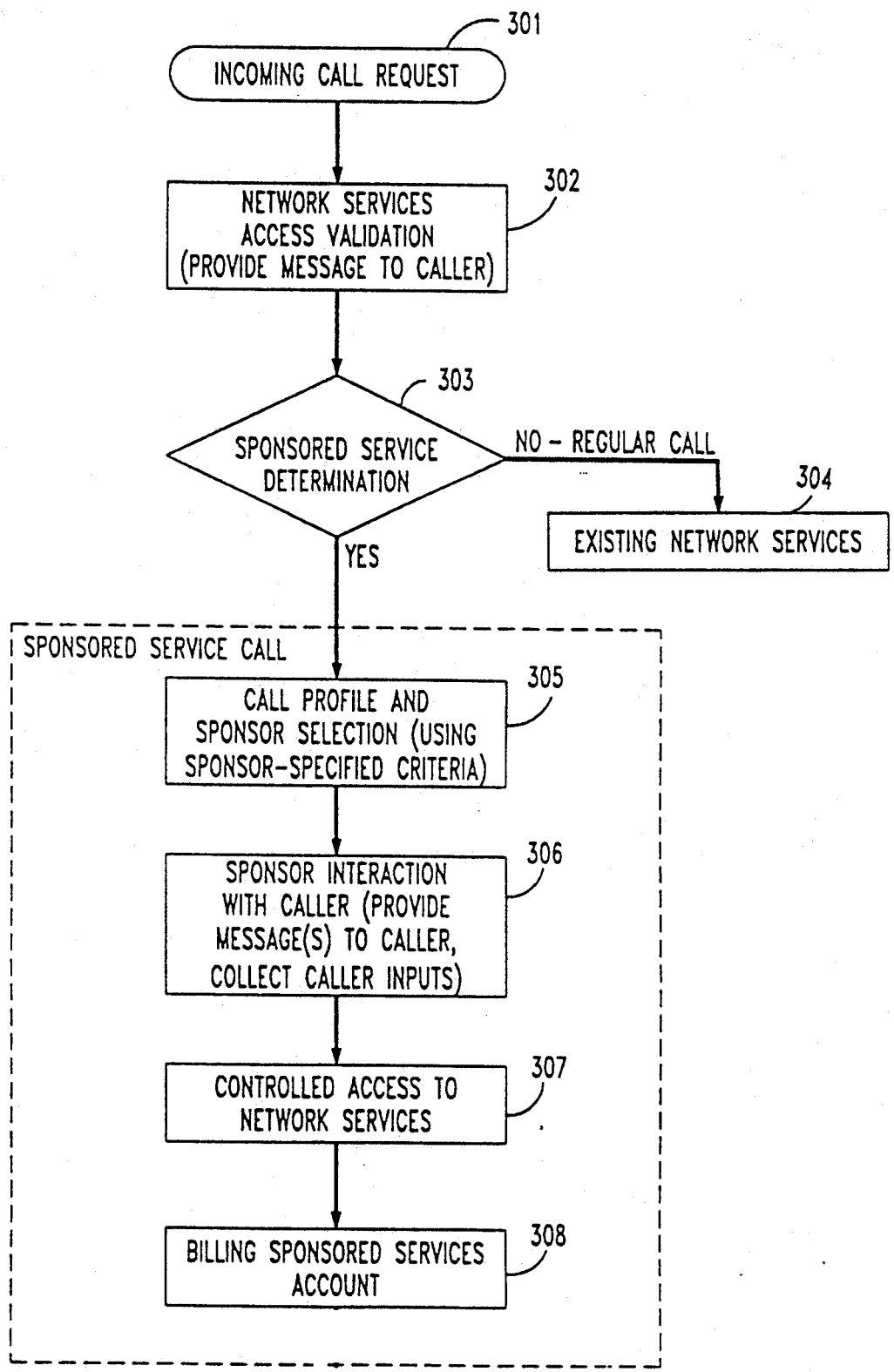
FIG. 3 shows a flow diagram of the illustrative operational steps to carry out the sponsor services in accordance with the present invention.

FIG. 3 shows an illustrative flow diagram of the operations of the sponsored services feature as it relates to the existing network services. In step 301 an incoming call request is received. In step 302, network services access validation unit 200 validates the incoming request as follows. As shown in FIG. 1, the caller's public or private terminals are connected via various facilities to various networks. When callers request access to a network service (e.g., a long distance call from a public phone), the network validates the request (e.g., deposit coins for the local call, selects IXC network for Inter-LATA call, etc.), and connects the call to the requested service.

In step 303 it is determined if a sponsored service feature has been selected. The network access validation unit 200, as described above, is adapted to select those calls requesting access to sponsored services feature. A number of selection criterias may be utilized to enable the network access validation unit 200 to determine such sponsored services requests. These sponsor service access criteria are shown in table 400 of FIG. 4. For example:

a. At the time when the caller has to enter the credit card number, deposit coins or request a collect call, the network gives caller a new choice to make this call a toll free sponsored call (note: such calls can be originated from public as well as private phones). This choice can be given in one of several ways, including, but not limited to the following conditions:
  -- upon detection of an invalid card number, the network treats it as a sponsored call;
  -- upon detecting a null card number (i.e.,# is the only response string), the network treats it as a request for sponsored call;
  -- when the caller fails to deposit coins within a network defined time window, the network treats it as request for sponsored call;
  -- when the caller deposits insufficient money, and does not deposit an additional sum within a specified time period, the network treats it as a request for sponsored call;
  -- when the caller dials specially designated number(s) for various sponsored network services, including but not limited to, long distance calling, directory assistance, etc.

b. For a call originated from private phones, for which the caller is billed directly and does not have to enter the credit or other billing information, the network can give access to the sponsored services based on the pre-subscription, or other form of positive identification from the caller (e.g., dialing of special digits, etc.).

c. For operator-assisted calls from public or private phones, the caller can instruct the operator (real or virtual) to give access to the sponsored services.

If none of the above illustrative sponsor services or other sponsor selected criteria are detected in step 303, the call is considered a regular call and is processed, in step 304, in accordance with existing network services call processing.

Assuming one of the above illustrative sponsored service selection criteria were met then the sponsored services feature is activated and the call handled as described in steps 305, 306, 307 and 308.

In step 305 the call profiling and sponsor selection is determined. The sponsored services overlay 210 includes a capability to define the incoming call's profile using a variety of information accessible to the network. Call profile characteristics used to assist in sponsor selection are shown in table 500 of FIG. 5. As shown in table 500, the network creates a call's profile based on a number of call characteristics or information elements including, but not limited to:

-- the origin of call: call from public or private phone, region or specific location of calling, caller's area of interest as determined by pre-subscription, or some other form of caller identification;
-- the call's destination: area or location, profile of the called party;
-- date and time of calling;
-- special events: Mother's Day, national holidays, major sports or other events, etc.

Using the call's profile in addition to previously provided sponsor-specified criteria, sponsored services overlay 210 specifies or selects the appropriate sponsor from a group of sponsors, and/or to select a sponsor's request from among multiple requests.

In step 306, the sponsor interacts with the caller. The caller's interaction with the sponsor may take a variety of forms, including the playing of sponsor provided information messages and/or the execution of an agreed set of instructions on behalf of the sponsor prior to completing the caller's call request. This interaction collectively is referred to hereinafter as playing the sponsor's information over the network. The sponsor's information can be played in a number of ways, including but not limited to the following:
-- the network plays voice, data or video message, depending on the type of service being used. Upon completion of this information, the network proceeds with the completion of caller's request;
-- the network connects the call to an external sponsor system 130 which interacts with the caller, as appropriate. Upon completion of the sponsor system's interaction with the caller, the network proceeds with the completion of the caller's request. The sponsor system's 130 interaction with the caller could include interaction with automated systems or operators to conduct some business transaction.

After the caller's interaction with sponsor is complete, the network proceeds in step 307 with completion of the caller's request giving controlled access to the authorized network service based on agreements with the selected sponsor. Typically, the sponsor system 130 either concurrently during the call or previously will have specified limits to be placed on the call. The network monitors the call duration to be within the limits specified by the sponsor. At the end of this duration limit, the network interrupts the call, and performs one or more of the following services:
-- terminates the call with appropriate message;
-- gives the caller an option to pay for the call and continue;
-- gives the caller an option to go through another interaction with a sponsor, and complete the caller's request as specified earlier.

In step 308, a sponsored services accounting or billing record is made which identifies the sponsor and the caller. The network keeps a record of the time caller spent interacting with sponsors as well as the use of network provided services (e.g. duration of long distance call, directory assistant calls) for billing purposes. Thus, the sponsor is billed for the charges associated with the connection between the caller and the sponsor. Additionally, the sponsor is billed for a predetermined portion of the charges for the caller usage of network-provided services.

What has been described is merely illustrative of the application of the principles of the present invention. Other arrangements and methods can be implemented by those skilled in the art without departing from the spirit and scope of the present invention.

I claim:

1. A method of operating a communication system comprising the steps of
   determining, in response to receiving an incoming call request from a caller over a facility of said communication system, whether the caller is to be connected to a sponsored service, and
   in response to a determination, providing the caller with an information message associated with said sponsored service in exchange for reducing calling charges charged to the caller by the system for completing the incoming call request.

2. The method of claim 1 wherein said determining step includes comparing the caller inputs against predetermined access criteria for the sponsored service.

3. The method of claim 1 wherein said determining step includes comparing a calling party number against a predetermined access criteria for the sponsored service.

4. The method of claim 1 wherein said determining step selects calls meeting predetermined access criteria for the sponsored service.

5. The method of claim 1 wherein following said determining step, the method performs the step of
   selecting a sponsor, from a group of service sponsors using sponsor-specified criteria, to provide said information message to the caller.

6. The method of claim 1 wherein said message is an audio message.

7. The method of claim 1 wherein
   said message is a non-audio message selected depending on the type of service being used over said facility by said caller.

8. The method of claim 1 wherein
   said message is provided to said communication system from a sponsor system connected thereto.

9. The method of claim 1 wherein
   said message is a pre-stored message provided by said system.

10. The method of claim 1 further comprising the steps of
    in response to a signal indicating the completion of said sponsored service, completing a call connection in accordance with said call request, and
    controlling the duration of said call connection using limits established by said sponsored service.

11. The method of claim 1 further comprising the step of
    recording the time said caller spent on said sponsored service.

12. The method of claim 1 further comprising the step of
    billing said sponsor for the charges associated with the connection between said caller and said sponsor.

13. The method of claim 1 further comprising the step of
    billing said sponsor for a predetermined portion of the charges for the caller usage of communication system services.

14. A communication system comprising
    means for determining, in response to receiving an incoming call request from a caller over a facility of said communication system, whether the caller is to be connected to a sponsored service, and
    means for providing, in response to a determination to connect the caller to a sponsored service, the caller with an information message associated with said sponsored service in exchange for reducing calling charges charged to the caller by the system for completing the incoming call request.

15. The system of claim 14 wherein said determining means compares the caller inputs against predetermined access criteria for the sponsored service.

16. The system of claim 14 wherein said determining means compares a calling party number against a predetermined access criteria for the sponsored service.

17. The system of claim 14 wherein said determining means selects calls meeting predetermined access criteria for the sponsored service.

* * * * *